United States Patent [19]

Desmons

[11] Patent Number: 5,034,821
[45] Date of Patent: Jul. 23, 1991

[54] OPTICAL SIGHT FOR TELEVISION CAMERA WITH AUTOMATIC GEOMETRY AND CONVERGENCE CORRECTION ADAPTED FOR BI-FORMAT FILMING, AND CAMERA EQUIPPED WITH SUCH A SIGHT

[75] Inventor: Gérard Desmons, Clichy, France
[73] Assignee: Thomson Video Equipement, Cergy, France
[21] Appl. No.: 523,605
[22] Filed: May 15, 1990

[30] Foreign Application Priority Data

May 26, 1989 [FR] France ................ 8906925

[51] Int. Cl.$^5$ ............................. H04N 5/30
[52] U.S. Cl. ............................. 358/224; 354/222
[58] Field of Search ............... 358/224, 225, 139, 22, 358/213.13, 51; 354/221, 222 X, 219; 33/297, 298; 356/247; 350/535, 566

[56] References Cited

U.S. PATENT DOCUMENTS

| | | | |
|---|---|---|---|
| 3,404,220 | 10/1968 | Favreau | 358/51 |
| 3,536,824 | 10/1970 | Chmillon | 358/51 |
| 4,628,342 | 12/1986 | Desmons et al. | 358/10 |
| 4,761,685 | 8/1988 | Asaida | 358/139 |

FOREIGN PATENT DOCUMENTS

| | | |
|---|---|---|
| 8101287 | 1/1981 | France. |
| 2526963 | 11/1983 | France. |
| 8208486 | 11/1983 | France. |
| 0085678 | 5/1983 | Japan. |

Primary Examiner—Howard W. Britton
Assistant Examiner—Sherrie Hsia
Attorney, Agent, or Firm—Marmorek, Guttman & Rubenstein

[57] ABSTRACT

The optical sight for the correction of the geometry of the convergences of a color camera according to the invention is such that it is adapted to the two most common formats and therefore usable in bi-format 4/3 and 16/9 cameras: the sight is constituted of a group of elementary motifs constituted of a central zone of n lines of p motifs and adjacent zones formed of two lines of p motifs used in addition to the central zone for the 4/3 format, and two columns of n motifs, used in addition to the central zone for the 16/9 format.

5 Claims, 1 Drawing Sheet

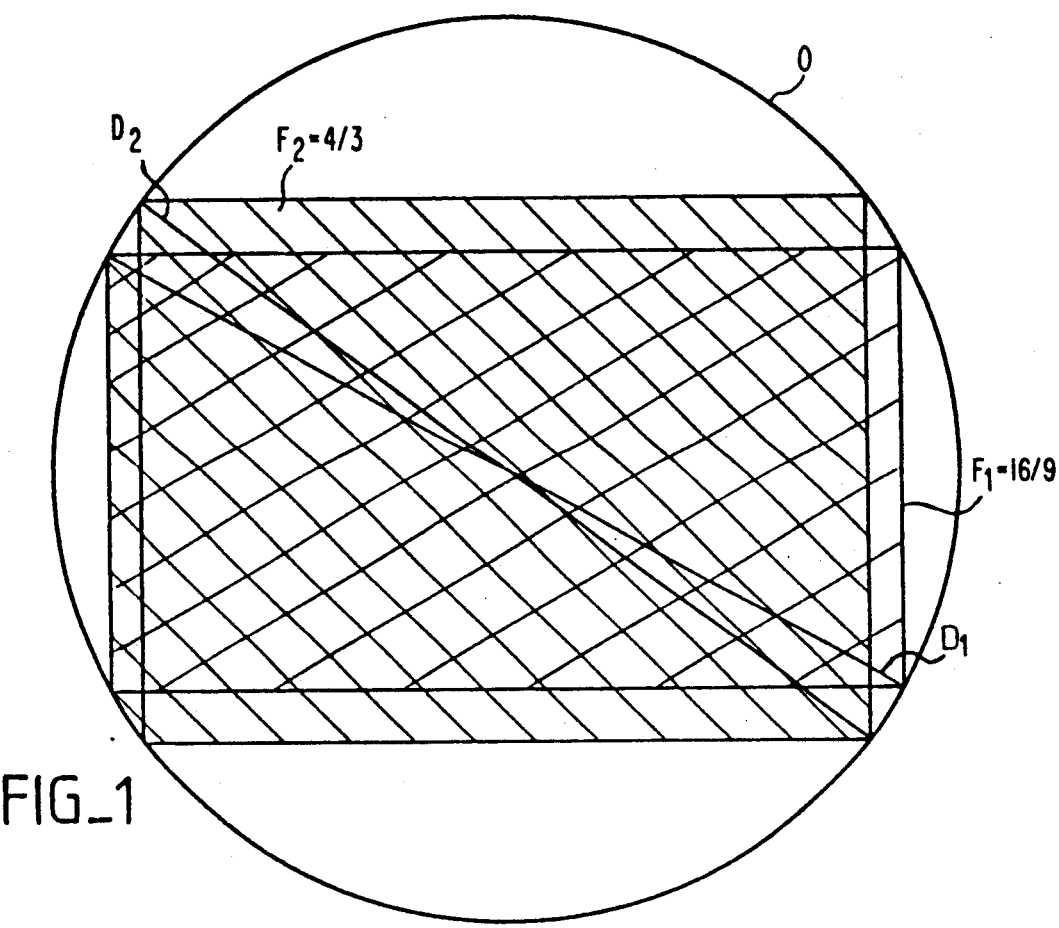
FIG_1
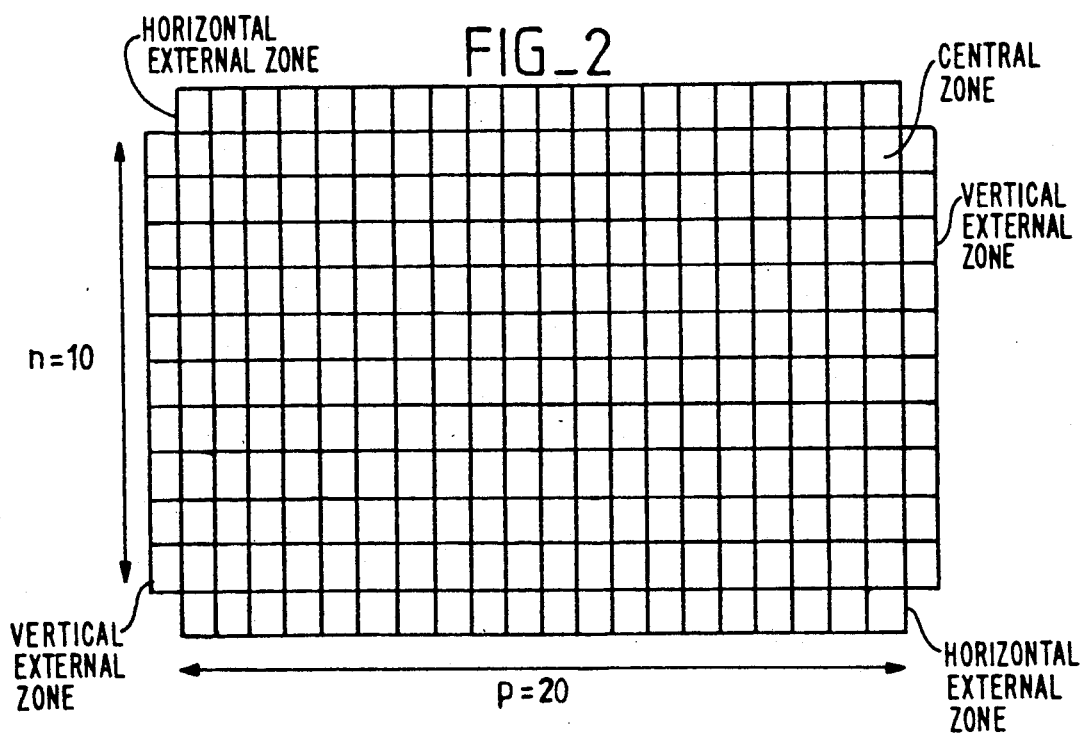
FIG_2

OPTICAL SIGHT FOR TELEVISION CAMERA WITH AUTOMATIC GEOMETRY AND CONVERGENCE CORRECTION ADAPTED FOR BI-FORMAT FILMING, AND CAMERA EQUIPPED WITH SUCH A SIGHT

BACKGROUND OF THE INVENTION

1. Field of the invention

The invention applies to television cameras, and more particularly to cameras which can film in either of the two most common formats (or H/V aspect ratios), i.e. in a conventional 4/3 format or in the more recent format, used notably for high-definition television, 16/9, H being the horizontal dimension of the image and V its vertical dimension.

The most efficient television cameras have automatic correction devices which process the information from the analysis of an optical reference sight or test pattern from which the measurements and the corresponding necessary corrections are carried out automatically. These corrections are corrections of convergence, contrast, etc.

French patent application no. 81 01287 describes an automatic correction device of this type, and French patent application no. 82 08486 describes an optical sight particularly suitable for the correction of defects in television images, and for their processing by the automatic correction device described in the first patent application referred to above.

Future television cameras are planned which will be able to film in either of the two formats 4/3 and 16/9. To change from one format to the other, the amplitudes of the scanning voltages of the camera tubes are modified.

2. Description of the prior art

The problem is then to have, for each of the two formats used, a sight in the correct format to serve as an absolute reference for automatic adjustment.

To solve this problem, certain cameras have been equipped with a separate rectangular sight for each format. Two solutions have been used for this purpose:

cameras incorporating in the filter holder two diascope devices each equipped with a specific sight have been used;

diascope lenses equipped with two or four sights have also been proposed.

These solutions present many technical difficulties as it is absolutely necessary that the two sights be perfectly aligned on the optical axis (centering and rotation) and identically lit (light level and uniformity) for the automatic correction device to function correctly, whatever the format used. The cost of such a solution is obviously high. In addition a device with a double sight requires a mechanical system to switch sights. Such a device is bulky, heavy, and incompatible with the light lenses intended in particular for reporting cameras; it can therefore not be used for light cameras carried on the shoulder.

The idea of the invention is to construct a single specific sight usable for both possible image formats.

According to the invention, an optical sight for a camera with automatic geometry and convergence correction, constituted by the horizontal and vertical repetition of an elementary motif on which the measurements necessary for corrections are based, is characterised by the fact that, for a bi-format 4/3 and 16/9 camera, the sight includes a central zone formed of n lines of p motifs, used for both formats, two adjacent external horizontal zones of length p elementary motifs and two adjacent external vertical zones of height n elementary motifs, the external horizontal zones being used with the central zone of n.p motifs for the 4/3 format and the vertical zones being used with the central zone of n.p motifs for the 16/9 format, and the diagonals of the sight surfaces used in the two formats being more-or-less equal.

Another object of the invention is a camera equipped with such a sight.

BRIEF DESCRIPTION OF THE DRAWINGS

The invention will be better understood and other characteristics will appear on reading the description of the appended figures below.

FIG. 1 represents the two possible formats superposed, with a diagonal of identical length;

FIG. 2 represents a mode of embodiment of the optical sight for a television camera adapted for filming in variable format according to the invention.

DESCRIPTION OF THE PREFERRED EMBODIMENT

As indicated notably in latent application no. 82 08486, an elementary motif for the sight particularly suitable for the necessary corrections due to defects in geometry and convergence of a television camera has a white diagonal and vertical motif on a black background, or vice versa, a black diagonal and vertical motif on a white background. The sight is made up of the repetition of this elementary motif in lines and columns.

In a camera with variable aspect ratio, so that filming with a given lens 0, having a determined diagonal D, should be as good as possible in both formats, the images form on the analysis sensor of the camera with the same diagonal $D_1=D_2=D$, whatever the aspect ratio used, $F_1=16/9$ or $F_2=4/3$, as shown in FIG. 1.

In the sight described in the patent mentioned above, the elementary motif was repeated 182 times, i.e. in 13 columns and 14 lines.

According to the invention, the sight has a number of motifs N such that:

there is compatibility with format $F_1=16/9$ by using X motifs out of N for automatic adjustment in 16/9 format;

there is compatibility with format $F_2=4/3$ by using Y motifs out of M for automatic adjustment in 4/3 format.

Of course, depending on the format used, the automatic microprocessor-based correction system is adapted to the number of motifs used in the sight.

Theoretically this problem would be solved by determining the highest common factor of the width of the image in 16/9 format and the width of the image in 4/3 format, and the highest common factor of the height of the image in 16/9 format and the height of the image in 4/3 format, the diagonal of the two images 16/9 and 4/3 being the same. In practice the figures obtained are not suitable as they give a number of motifs M much too high for processing to be possible.

The problem is linked to the fact that we assume the identity of the diagonals $D_1$, $D_2$ for the two formats, the lens thus being used in the best conditions for both formats. Taking into account this preliminary assumption, the solution is to accept a tolerance on the diagonals in 16/9 and 4/3 with respect to the theoretical diagonal of the lens.

Thus, a good solution to the problem according to the invention is obtained with the sight as represented in FIG. 2 with 12 horizontal lines of motifs and 22 vertical columns of motifs, giving 260 motifs, the first and last lines of the sight having only 20 motifs horizontally, and the first and last columns having only 10 motifs vertically. Thus, for format $F_1=16/9$ the sight is used with 22 motifs horizontally and 10 motifs vertically, i.e. $X=220$ motifs, and the sight for format $F_2=4/3$ is used with 20 motifs horizontally and 12 motifs vertically, i.e. $Y=240$ motifs.

The invention is not restricted to the mode of embodiment precisely described with reference to FIG. 2; other tolerances enabling viable solutions to be found in which the number of motifs is compatible with the processing used can be envisaged:

a tolerance on the width of the image, the height corresponding to a fixed diagonal being retained, can provide another solution;

a tolerance on the height of the image, the width in both formats being that planned for motifs of constant width can also provide another solution.

It is also possible to control the automatic correction adjustment from a small part of the image.

Among the different possibilities, the most interesting solutions, giving a fairly small number of motifs compatible with the processing circuits, could be:

$M=196$ motifs for a precision of 1.1%, the 16/9 sight using 20 motifs horizontally and 8 motifs vertically, i.e. $X=160$, the 4/3 sight using 18 motifs horizontally and 10 motifs vertically, i.e. $Y=180$;

$M=186$ motifs for a precision of 1.3%, the 16/9 sight using 19 motifs horizontally and 8 motifs vertically, i.e. $X=152$, the 4/3 sight using 17 motifs horizontally and 10 motifs vertically, i.e. $Y=170$.

In all cases, the sight includes a central zone common to both scanning formats, and two external zones in lines and columns specific to each format. In the cases of greatest interest mentioned above, the external zones correspond to a single line or column of motifs on each side, horizontally and vertically; the external vertical zones are used only in 16/9 format and the external horizontal zones only in 4/3 format.

The invention is not limited to the examples precisely described above. In general it can be said that a sight with a central zone of n lines of p motifs where n is between 8 and 10 and p is between 17 and 20, with additional external zones formed of an extra line of motifs at the top and bottom for the 4/3 format and an extra column of motifs to the left and right for the 16/9 format, enables the problem to be solved while remaining within acceptable tolerances.

What is claimed is:

1. An optical sight suitable for use with a camera which records in a first 4/3 format and in a second 16/9 format, said optical sight comprising:

a pattern formed by the repetition of an elementary motif on a surface of said sight, said pattern including:

a central zone for use by both formats and formed from n lines each including p repetitions of said elementary motif, two horizontal external zones formed adjacent to said central zone for use in combination with said central zone by the first 4/3 format, each of said horizontal external zones comprising a line of p repetitions of said elementary motif, and two vertical external zones formed adjacent to said central zone for use in combination with said central zone by the second 16/9 format, each of said vertical external zones having a height of n elementary motifs, a diagonal of the zones utilized by said first format being equal to within a tolerance of a diagonal of the zones utilized by said second format.

2. The optical sight of claim 1 wherein:

each of said horizontal external zones comprises one line of elementary motifs, and each of said vertical external zones comprises one column of elementary motifs 3. The optical sight of claim 1 wherein $n=10$ and $p=20$.

4. The optical sight of claim 1 wherein $n=8$ and $p=18$.

5. The optical sight of claim 1 wherein $n=8$ and $p=17$.

* * * * *